J. E. WEBSTER.
RESILIENT DRIVING CONNECTION.
APPLICATION FILED JULY 6, 1908.

993,570.

Patented May 30, 1911

2 SHEETS—SHEET 1.

WITNESSES:
C. L. Belcher
Otto J. Schairer

INVENTOR
John E. Webster
BY
Wesley G. Carr
ATTORNEY

J. E. WEBSTER.
RESILIENT DRIVING CONNECTION.
APPLICATION FILED JULY 6, 1908.

993,570.

Patented May 30, 1911.
2 SHEETS—SHEET 2.

WITNESSES:

INVENTOR
John E. Webster
BY
ATTORNEY

UNITED STATES PATENT OFFICE.

JOHN E. WEBSTER, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

RESILIENT DRIVING CONNECTION.

993,570.  Specification of Letters Patent.  Patented May 30, 1911.

Application filed July 6, 1908. Serial No. 442,207.

*To all whom it may concern:*

Be it known that I, JOHN E. WEBSTER, a citizen of the United States, and a resident of Pittsburg, in the county of Allegheny and State of Pennsylvania, have invented a new and useful Improvement in Resilient Driving Connections, of which the following is a specification.

My invention relates to power transmission mechanism, and it has for its object to provide a simple and effective connection between a driving and a driven member that shall possess both great resilience and strength.

When alternating current motors are employed in the propulsion of railway vehicles, the vibrations caused by the alternations of the current are frequently transmitted from the motor to other parts, and, particularly when the frequency of alternations of the current is low, the vibrations thus transmitted are often objectionable.

The purpose of the present structure is to introduce sufficient flexibility between the motor and the parts driven thereby to effectively prevent transmission of the vibrations in an objectionable degree. The connection also possesses great strength and is effective in cushioning the shocks and jars which may be caused by suddenly exerted high torques.

Figure 1:
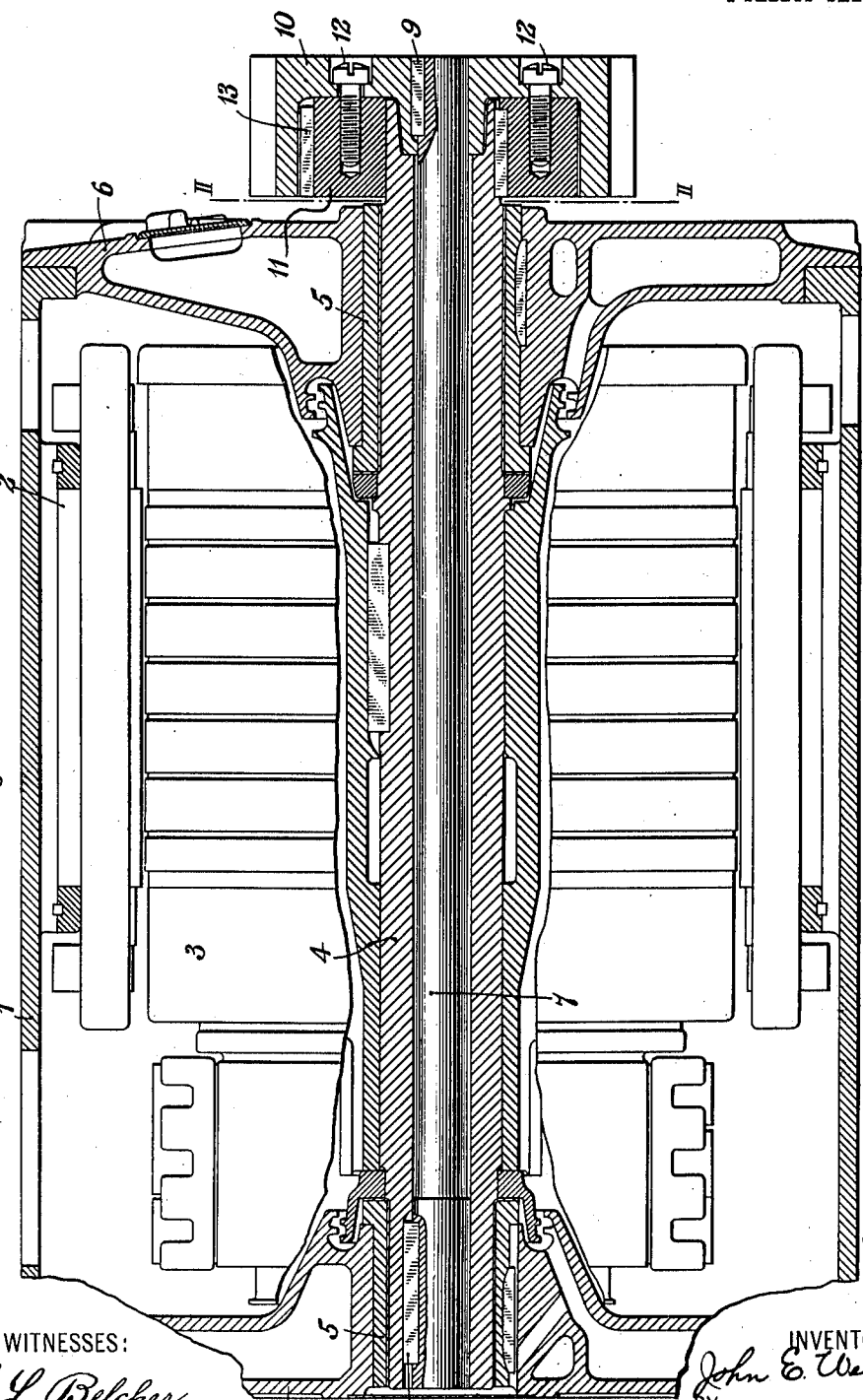
Figure 2:
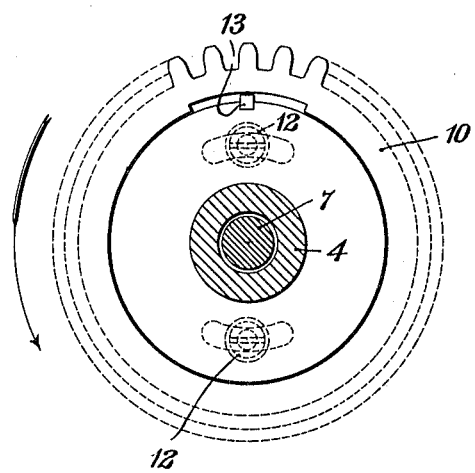

The features of novelty reside in the structural details which will be more fully set forth in connection with the accompanying drawings, Figure 1 of which is a view, in longitudinal section and in side elevation, of a machine embodying the invention, and Fig. 2 is a view in transverse section and in end elevation of some of the parts along the line II—II of Fig. 1.

The invention is here shown as embodied in an electric motor comprising a stationary fram 1 supporting a field structure 2, and an armature 3 that is mounted upon a sleeve or hollow shaft 4 for which bearings 5 are provided in end brackets 6 that are secured to and close the ends of the frame 1.

Within the sleeve or hollow shaft 4 is a solid shaft 7 having one end secured along a relatively short portion of its length, by means of a key 8, to the corresponding end of the sleeve 4, its other end projecting beyond the end of the said sleeve. The shaft 7 is composed of a material, such as a high grade of spring steel, that possesses sufficient resilience to permit of a considerable relative torsional movement between the free end thereof and the sleeve 4.

Upon the projecting end of the shaft 7 is secured, by means of a key 9, a pinion 10 that overhangs the end of the sleeve 4 and a cylindrical block 11 that is supported upon and keyed to the outer end of the sleeve. The pinion 10 is secured to the cylindrical block 11 by means of screws 12 that project through circumferentially curved slots in the pinion, the connection between the said parts being such as to permit of relative movement between the same, which movement is limited, not only by engagement of the screws with the ends of the slots in the pinion, but also by a key 13 that is secured to the outer face of the cylindrical block 11 and projects into a recess in the inner cylindrical face of the pinion 10.

It will be readily understood that, when the armature 3 drives the sleeve by means of a varying or intermittent torque due to the alternations of the current supplied to the motor, the power thus exerted is transmitted to the shaft 7 through the key 8, which latter shaft, by reason of its resilience, absorbs the vibrations and prevents their transmission, at least in an objectionable degree, to the pinion 10. By reason also of the resilience of the shaft 7, suddenly exerted torques will be cushioned thereby. If the torque exerted by the motor exceeds a predetermined amount, the screws 12 will engage corresponding ends of the slots in the pinion through which they project, and the key 13 will be brought into engagement with one end of the recess in the pinion 10, thus relieving the shaft 7 of undue strains.

Many of the structural details may be greatly modified within the spirit of the invention. For instance, the sleeve 4 and the shaft 7 may be connected together at any other suitable point than that shown, and the structure and arrangement of the parts whereby the shaft 7 is connected to the pinion, or other member for transmitting its motion, and the means for limiting the relative movement between the sleeve 4 and the shaft 7 are also susceptible of many variations. The structure shown is only illustrative of suitable and operative means whereby the invention may be carried into effect.

I claim as my invention:

1. In a driving motor, the combination with a hollow shaft, a rotatable member secured thereto, a rod secured to the hollow shaft at one end and extending through it, and a driving member supported by the hollow shaft and secured to the free end of the rod.

2. In a driving motor, the combination with a rotatable member, a hollow shaft therefor, a rod extending through the hollow shaft and secured to it at one end, and a gear member secured to the free end of the rod and supported by the hollow shaft.

3. In a driving motor, the combination with a rotatable member, a hollow shaft therefor, a rod extending through the hollow shaft and secured to it at one end, and a driving gear member secured to the free end of the rod, rotatably supported by the hollow shaft and connected to the latter by a lost motion connection.

4. The combination with a driving member, and a sleeve upon which the same is mounted, of a shaft located within the sleeve and secured thereto along a relatively short portion of its length, a driven member mounted upon one end of the shaft, a cylindrical member mounted upon the corresponding end of the sleeve, the said cylindrical member being overhung and partially inclosed by the driven member, and means associated with the cylindrical member and the driven member for limiting relative movement between the same.

In testimony whereof, I have hereunto subscribed my name this 2nd day of July, 1908.

JOHN E. WEBSTER.

Witnesses:
VERYL BROUGHTON,
BIRNEY HINES.